3,048,569
VINYL PERFLUOROALKYLSULFIDES AND POLYMERS
John F. Harris, Jr., Wilmington, Del., assignor to E. I. du Pont de Nemours and Company, Wilmington, Del., a corporation of Delaware
No Drawing. Filed Sept. 28, 1960, Ser. No. 58,910
24 Claims. (Cl. 260—79.7)

This invention relates to unsaturated compounds and to their polymers. More particularly, it relates to, and has as its primary objects provision of, ethylenically unsaturated compounds containing fluorine and sulfur, methods for their preparation, and polymers thereof.

A large number of unsaturated compounds are known and many of these have been converted to polymers having valuable properties. Some of these polymers have achieved commercial success because of particular properties they possess that make them useful in particular applications. The suitability of any polymer for use in any particular application depends to a great extent on the chemical structure of the monomer from which it is prepared. It is therefore a desirable goal to provide new ethylenically unsaturated compounds having particular structures that are capable of forming polymers having new and improved properties. It is also desirable to provide new ethylenically unsaturated compounds that are useful as intermediates in the preparation of other new compounds.

A new class of ethylenically unsaturated compounds that are readily polymerizable are provided by this invention. The novel ethylenically unsaturated monomers of this invention are the vinyl perfluoroalkyl sulfides. A preferred group of the products of this invention are those in which the perfluoroalkyl group contains up to 9 carbon atoms. This invention also includes the addition polymers of these vinyl perfluoroalkyl sulfides. The polymers of this invention include both the homopolymers of the vinyl perfluoroalkyl sulfides and their copolymers with one or more other copolymerizable unsaturated compounds. Preferably, the copolymers contain at least 5% of the vinyl perfluoroalkyl sulfide component.

The vinyl perfluoroalkyl sulfides of this invention can be prepared by the addition of ethylene to a perfluoroalkanesulfenyl halide, e.g., a perfluoroalkanesulfenyl chloride, to form a 2-haloethyl perfluoroalkyl sulfide, which is then dehydrohalogenated by treatment with an alkali metal hydroxide, e.g., potassium hydroxide, to a vinyl perfluoroalkyl sulfide.

The reaction of ethylene with a perfluoroalkanesulfenyl halide takes place in the absence of any solvent or reaction medium. However, it is preferred that a polar solvent that is inert to the perfluoroalkanesulfenyl halide be employed. Suitable solvents include tetramethylenesulfone, diethyl ether, dioxane, and acetonitrile. Acetonitrile is especially preferred as a reaction medium since this solvent has a catalytic effect in increasing the rate of reaction.

The reaction can be carried out over a wide range of temperatures, e.g., from room temperature (20–30° C.) up to the decomposition temperature of the reactants or the products. Temperatures of 50–150° C. are especially useful. Reaction proceeds rapidly at moderately elevated temperatures, for example, reaction times of a few minutes at 50–150° C. using acetonitrile as reaction medium are satisfactory. Longer reaction times, say up to 5–10 hours, can be employed but there is no practical advantage in using such long times.

The reaction pressure is likewise not critical. Atmospheric or superatmospheric pressures can be employed. It is very convenient to carry out the reaction at the autogenous pressure developed by the reaction mixture in a closed reaction vessel at the operating temperature. Ethylene can also be introduced into the perfluoroalkanesulfenyl halide maintained at reflux temperature and atmospheric pressure.

The ethylene used in this process can be of the ordinary grades commercially available. The perfluoroalkanesulfenyl chlorides used in the process can be made by known methods. For example, the perfluoroalkanesulfenyl chlorides can be made by reaction of a perfluoroalkyl disulfide, e.g., trifluoromethyl disulfide, with chlorine as described by Haszeldine and Kidd (J. Chem. Soc. 1953, 3219).

The dehydrohalogenation of the 2-haloethyl perfluoroalkyl sulfides obtained as described above is conveniently carried out by contacting the 2-haloethyl perfluoroalkyl sulfide with at least an equimolar quantity of an alkali metal hydroxide, e.g., potassium hydroxide. While the use of an inert reaction medium is not essential in this dehydrohalogenation process, it is preferred that one be employed. Absolute ethyl alcohol is quite suitable as it dissolves the alkali metal hydroxide and the dehydrohalogenation is conveniently carried out at the reflux temperature of the mixture. A dispersion of powdered alkali metal hydroxide in a high boiling hydrocarbon can also be employed. The dehydrohalogenation takes place over a wide range of temperatures but temperatures of 50°–80° C. are very satisfactory. The vinyl perfluoroalkyl sulfide obtained in the reaction should not however be exposed to the alkali metal hydroxide for excessively long times since such exposure causes decomposition of the product.

An alternative method for the preparation of the vinyl perfluoroalkyl sulfides of this invention comprises the free radical-catalyzed addition of a vinyl halide, e.g., vinyl fluoride, chloride, bromide, or iodide, to a perfluoroalkanethiol. The resulting 2-haloethyl perfluoroalkyl sulfide can be dehydrohalogenated as described previously.

This alternative process does not require the use of any solvent or reaction medium. However, if desired, it can be carried out in a solvent that is inert to the reactants, e.g., carbon tetrachloride. Any convenient source of free radicals can be employed in this process. Organic and inorganic peroxides are quite suitable. Examples of specific peroxides that are useful include benzoyl peroxide, t-butyl hydroperoxide, dicumylperoxide, ammonium persulfate, and the like. Ultraviolet light is also very satisfactory since the photochemical reaction takes place quite rapidly at ordinary temperatures. For example, the reaction is completed in about 15 minutes when the reaction mixture is irradiated with ultraviolet light from a low pressure mercury resonance lamp. The actual time of reaction will of course depend on the distance from the source of ultraviolet light to the reaction mixture being irradiated, and on the strength of the light source. Any irradiating device may be used provided the light it emits contains at least some radiation of ultraviolet or near ultraviolet wavelengths, i.e., wavelengths between about 0.015 and 0.04 micron. Commercial mercury arc sunlamps are satisfactory. The reaction vessel being used should of course be transparent to ultraviolet light. Sunlight can also be employed as the source of ultraviolet light.

Perfluoroalkanethiols used in this alternative process can be prepared by known methods. For example, perfluoropropane-1-thiol can be prepared by heating perfluoro-n-propyl iodide with sulfur at 250° C. for several hours to form the disulfide $(n-C_3F_7)_2S_2$. This disulfide is then converted to $(n-C_3F_7)_2Hg$ by treatment with mercury in the presence of ultraviolet light. The bis(perfluoropropyl)mercury is then treated with anhydrous HCl to produce perfluoropropane-1-thiol. This method is described in greater detail by Haszeldine and Kidd, J. Chem. Soc. 1955, 3871. See also page 337 of "Aliphatic Fluorine Compounds," by Lovelace, Rausch and Postelnek, Reinhold Publishing Corp., New York, 1952.

The vinyl perfluoroalkyl sulfide polymers of this invention can be prepared by conventional addition polymerization methods from vinyl perfluoroalkyl sulfide monomer alone or from mixtures of a vinyl perfluoroalkyl sulfide monomer with one or more other copolymerizable ethylenically unsaturated compounds. The vinyl perfluoroalkyl sulfide monomer can be polymerized, or copolymerized with another copolymerizable monomer, by emulsion, bead, bulk, and solution methods in the presence of an addition polymerization initiator. Suitable free radical liberating initiators include those of the peroxy type, e.g., the dialkyl peroxides such as di-t-butyl peroxide; diacyl peroxides, such as diacetyl peroxide and dibenzoyl peroxide; hydroperoxides, e.g., tertiary butyl hydroperoxide; and the persulfates, e.g., ammonium persulfate and sodium persulfate. Azo initiators are also suitable for preparing the polymers of this invention. Specific examples of operable azo initiators include $\alpha,\alpha'$-azodiisobutyronitrile, 1,1'-azodicyclohexanecarbonitrile, dimethyl $\alpha,\alpha'$-azodiisobutyrate, $\alpha,\alpha'$-azodiisobutyramide and $\alpha$-(carbamoylazo)isobutyronitrile. These free radical-liberating initiators can be used over a wide range of concentrations. For example, concentrations ranging from 0.01% up to 10% or more, based on the weight of the polymerizable monomers can be used. Preferably, the initiators are used in a concentration of 1–5% (by weight), of the polymerizable monomers.

The products and process of this invention are illustrated in further detail by the following examples in which proportions of ingredients are expressed in parts by weight unless otherwise stated.

EXAMPLE I

*Preparation of Vinyl Trifluoromethyl Sulfide*

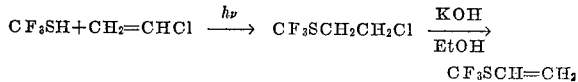

A mixture of 15 parts of vinyl chloride and 25 parts of trifluoromethanethiol contained in a quartz reaction vessel fitted with a stirrer and a condenser cooled by acetone and solid carbon dioxide is irradiated with a low pressure mercury resonance lamp for a period of 15 minutes. Upon distillation of the reaction mixture, there is obtained 31.9 parts (78% of theory) of trifluoromethyl 2-chloroethyl sulfide as a colorless liquid distiling at 94–98° C. and having a refractive index, $n_D^{25}$ of 1.3939.

*Analysis.*—Calc'd for $C_3H_4ClF_3S$: Cl, 21.6%; S, 34.6%. Found: Cl, 21.8%; S, 34.8%.

A mixture of 37.7 parts of trifluoromethyl 2-chloroethyl sulfide and 39.5 parts of absolute ethyl alcohol is heated to reflux in a flask fitted with a reflux condenser through which warm water is circulating and which is vented through a trap cooled with a mixture of acetone and solid carbon dioxide. While this solution refluxes vigorously, a solution of 37.7 parts of potassium hydroxide in 197 parts of absolute ethyl alcohol is added in a small stream over a period of about 0.5 hour. Distillation of the material collected in the cold trap yields 12 parts of trifluoromethyl vinyl sulfide distilling at 22° C. After being dried over anhydrous magnesium sulfate, the product is analyzed.

*Analysis.*—Calc'd for $C_3H_3F_3S$: F, 44.5%; S, 25.0%. Found: F, 43.9%, 44.1%; S, 25.1%, 25.4%.

EXAMPLE II

*Polymerization of Vinyl Trifluoromethyl Sulfide*

A. *Peroxide initiation.*—Ten parts of vinyl trifluoromethyl sulfide and 0.2 part of benzoyl peroxide are sealed in a hard glass polymerization tube and heated in an oil bath maintained at 75–83° C. for 21 hours. The solid polymer that forms in the tube is removed by extraction with ether. After evaporation of the ether, the polymer sample is dried in a vacuum oven for 18 hours at 100° C. There is obtained 9.50 parts of poly(vinyl trifluoromethyl sulfide). The polymer is purified by precipitation from an ether-pentane (1:5) mixture. A sample purified in this manner has an inherent viscosity of 0.87 (measured at 0.1% concentration in acetone at 25° C.) and is pressed at 50° C. under 1000 lb. ram pressure into a film which possesses some elastomeric properties. The polymer is soluble in acetone, benzene and ether, and is useful as a water-proofing agent for wood and paper.

*Analysis.*—Calc'd for $(C_3H_3F_3S)_x$: F, 44.5%; S, 25.0%. Found: F, 44.7%; S, 25.4%.

B. *Azonitrile initiation.*—One part of vinyl trifluoromethyl sulfide and 0.02 part of $\alpha,\alpha'$-azodiisobutyronitrile are sealed in a hard glass polymerization tube and heated in an oil bath maintained at 90–96° C. for 15 hours. The solid polymer that forms in the tube is removed by extraction with ether, and dried in a vacuum oven as described in part A. There is thus obtained 1.0 part of polymeric vinyl trifluoromethyl sulfide.

EXAMPLE III

*Copolymerization of Vinyl Trifluoromethyl Sulfide With Acrylonitrile*

A mixture of 1 part of acrylonitrile and 1 part of vinyl trifluoromethyl sulfide with approximately 0.04 part of benzoyl peroxide is sealed in a glass polymerization tube and heated in an oil bath at 75–80° C. for 2 hours. The tube is opened and the portion of the polymer which is wet and fluffy is removed. This is dried and analyzed. The analytical data obtained (12.6% fluorine and 6.12% sulfur) indicate that this sample is a copolymer containing about 25% vinyl trifluoromethyl sulfide and 75% acrylonitrile. This portion of copolymer amounts to 0.55 part. Another portion of polymer amounting to 0.40 part is obtained as a hard cake at the bottom of the polymerization tube. This material is ground up and analyzed (8.88% fluorine and 3.32% sulfur). The analytical results indicate that the copolymer contains a smaller proportion of vinyl trifluoromethyl sulfide than the fluffy portion.

EXAMPLE IV

*Copolymerization of Vinyl Trifluoromethyl Sulfide With Methyl Methacrylate*

A mixture of about 1 part of methyl methacrylate, about 1 part of vinyl trifluoromethyl sulfide and 0.04 part of benzoyl peroxide is sealed in a glass polymerization tube and heated in an oil bath at 75–80° C. for a period of 20 hours. The tube is opened and the volatile portion of the reaction mixture is allowed to evaporate. The remaining solid copolymer of vinyl trifluoromethyl sulfide and methyl methacrylate is removed from the tube by extraction with acetone. The acetone is evaporated, and there is obtained 1.8 parts of copolymer containing 20.54% fluorine. This analysis indicates that the copolymer contains approximately 46% vinyl trifluoromethyl sulfide and 54% methyl methacrylate. This copolymer forms clear films when cast from acetone.

EXAMPLE V

*Preparation of Vinyl Pentafluoroethyl Sulfide*

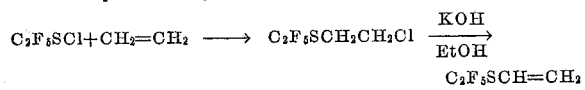

A mixture of 36.4 parts of pentafluoroethanesulfenyl chloride, 23.5 parts of acetonitrile and 10 parts of ethylene is heated in a stainless steel autoclave at 100° C. for 5 hours. After being cooled to room temperature, the autoclave is opened and the reaction mixture is poured into water. The organic layer is separated, extracted once with water, and dried over anhydrous magnesium sulfate. The dried organic layer is distilled through a small spinning band fractionating column. There is obtained 26.6 parts of 2-chloroethyl pentafluoroethyl sulfide as a colorless liquid distilling at 49° C./22 mm.; $n_D^{25}$=1.3730.

*Analysis.*—Calc'd for $C_4H_4ClF_5S$: Cl, 16.5%; S, 44.2%. Found: Cl, 16.4%; S, 44.1%.

A solution of 22.7 parts of 2-chloroethyl pentafluoroethyl sulfide in 19.7 parts of absolute ethyl alcohol is heated to reflux in a reaction vessel of the type described in Example I and there is then added 19 parts of potassium hydroxide in 103 parts of absolute ethyl alcohol as described in Example I. Distillation of the material collected in the cold trap yields 17 parts (90% of theory) of vinyl pentafluoroethyl sulfide as a colorless liquid distilling at 45° C. and having a refractive index, $n_D^{24}$ of 1.3350–1.3356.

*Analysis.*—Calc'd for $C_4H_3F_5S$: S, 18.0%. Found: S, 18.3%.

EXAMPLE VI

*Polymerization of Vinyl Pentafluoroethyl Sulfide*

A mixture of approximately 1 part of vinyl pentafluoroethyl sulfide and 0.02 part of benzoyl peroxide is sealed in a hard glass polymerization tube and heated in an oil bath at 80–90° C. for 65 hours. The polymer is removed from the reaction tube at the end of this time by ether extraction. The ether is evaporated and the residual polymer is heated in a vacuum oven at 90° C. for 1 hour. There is thus obtained 0.96 part of poly(vinyl pentafluoroethyl sulfide). This polymer is a tacky, low molecular weight transparent solid.

*Analysis.*—Calc'd for $(C_4H_3F_5S)_x$: F, 53.3%; S, 18.0%. Found: F, 52.1%; S, 17.9%.

EXAMPLE VII

*Preparation of Vinyl Perfluoro-5-Methylhexyl Sulfide*

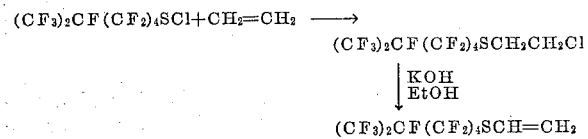

A mixture of 46.1 parts of perfluoro-5-methylhexanesulfenyl chloride (prepared as described below), 39 parts of acetonitrile and 10 parts of ethylene is heated in a stainless steel autoclave at 100° for 4 hours. After being cooled to room temperature, the autoclave is opened and the reaction mixture is poured into water. The organic layer is separated, dried over anhydrous magnesium sulfate and distilled through a small spinning band still. There is obtained 35.1 parts of 2-chloroethyl perfluoro-5-methylhexyl sulfide as a colorless liquid distilling at 40° C./0.6 mm., 46° C./0.85 mm., $n_D^{25}$=1.3510.

*Analysis.*—Calc'd for $C_9H_4ClF_{15}S$: F, 61.3%; Cl, 7.6%. Found: F, 61.2%; Cl, 7.5%.

Five parts of 2-chloroethyl perfluoro-5-methylhexyl sulfide is added to a refluxing solution of 2.0 parts of potassium hydroxide in 20 parts of absolute ethyl alcohol over a period of 10 minutes. The mixture is refluxed an additional 5 minutes and then poured into a large excess of cold water. The product is removed by one extraction with 50 parts of ether. The ether solution is rinsed once with water, dried over anhydrous magnesium sulfate and then distilled through a small spinning band still. There is thus obtained 2.02 parts of vinyl perfluoro-5-methylhexyl sulfide as a colorless liquid distilling at 82° C./55 mm., $n_D^{25}$=1.3330.

*Analysis.*—Calc'd for $C_9H_3F_{13}S$: F, 66.6%; S, 7.5%. Found: F, 65.7%; S, 6.7%.

The perfluoro-5-methylhexanesulfenyl chloride is prepared starting with perfluoroisopropyl iodide in the following manner: Perfluoroisopropyl iodide is heated with tetrafluoroethylene at 220° C. for several hours. The 2:1 telomer, perfluoro-5-methylhexyl iodide, is separated by distillation and heated with sulfur for several hours at 250° C. This results in the formation of a series of polysulfides from which bis(perfluoro-5-methylhexyl) disulfide is separated by distillation. Chlorination of this disulfide with chlorine at 150° C. results in the formation of perfluoro-5-methylhexanesulfenyl chloride in high yield:

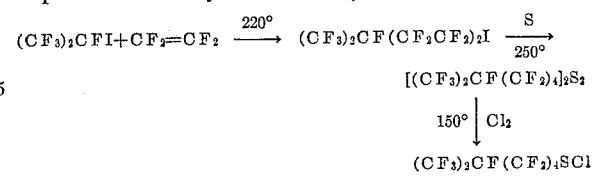

EXAMPLE VIII

*Polymerization of Vinyl Perfluoro-5-Methylhexyl Sulfide*

A mixture of approximately 1 part of vinyl perfluoro-5-methylhexyl sulfide, and 0.02 part of benzoyl peroxide is sealed in a hard glass polymerization tube and heated in an oil bath at 85–95° C. for 20 hours. The tube is opened and the polymer scraped out and dried in a vacuum oven at 90° C. for 2 hours. There is thus obtained 1.06 parts of poly(vinyl perfluoro-5-methylhexyl sulfide). This polymer is a viscous grease-like material which is useful as a lubricant.

The examples have illustrated the products and process of this invention by reference to specific vinyl perfluoroalkyl sulfides and certain of their polymers. However, the products of this invention include any vinyl perfluoroalkyl sulfide and polymers thereof, including homopolymers and copolymers of the vinyl perfluoroalkyl sulfide with one or more other ethylenically unsaturated copolymerizable monomers. Examples of other specific vinyl perfluoroalkyl sulfides included by this invention are listed in the second column of the following Table I. The reactants from which these specific sulfides can be prepared by the process of this invention, i.e., by the addition of a perfluoroalkanesulfenyl halide to ethylene followed by dehydrohalogenation of the resulting perfluoroalkyl 2-haloethyl sulfide by means of an alkali metal hydroxide, are listed in the first column of the following table.

TABLE I

| Reactant | Vinyl Perfluoroalkyl Sulfide |
| --- | --- |
| $CF_3SBr$ | $CF_3SCH=CH_2$ |
| $n\text{-}C_3F_7SCl$ | $n\text{-}C_3F_7SCH=CH_2$ |
| $(CF_3)_2CFSCl$ | $(CF_3)_2CFSCH=CH_2$ |
| $CF_3CF_2CF_2CF_2SCl$ | $CF_3CF_2CF_2CF_2SCH=CH_2$ |
| $CF_3(CF_2)_8SCl$ | $CF_3(CF_2)_8SCH=CH_2$ |
| $CF_3(CF_2)_{11}SCl$ | $CF_3(CF_2)_{11}SCH=CH_2$ |

The perfluoroalkyl vinyl sulfides of this invention can also be prepared by the method used in Example I. Examples of such sulfides that can be prepared by this method are listed in the third column of the following Table II. The perfluoroalkanethiols and vinyl halides from which the intermediate perfluoroalkyl 2-haloethyl sulfides are prepared and then dehydrohalogenated by means of alkali metal hydroxide are listed in the first and second columns of the table.

TABLE II

| Reactants | | Vinyl Perfluoroalkyl Sulfide |
|---|---|---|
| CF₃SH | CH₂=CHF | CF₃SCH=CH₂ |
| CF₃SH | CH₂=CHBr | CF₃SCH=CH₂ |
| CF₃SH | CH₂=CHI | CF₃SCH=CH₂ |
| n-C₃F₇SH | CH₂=CHCl | n-C₃F₇SCH=CH₂ |
| n-C₄F₉SH | CH₂=CHCl | n-C₄F₉SCH=CH₂ |
| n-C₆F₁₃SH | CH₂=CHCl | n-C₆F₁₃SCH=CH₂ |
| n-C₉F₁₉SH | CH₂=CHCl | n-C₉F₁₉SCH=CH₂ |
| n-C₁₅F₃₁SH | CH₂=CHCl | n-C₁₅F₃₁SCH=CH₂ |

The vinyl perfluoroalkyl sulfides of this invention are especially useful for addition polymerization (alone or with one or more other copolymerizable monomers) to polymers that are in turn useful in various applications. The vinyl perfluoroalkyl sulfides of this invention are more easily polymerized than the previously known fluoroalkyl fluorovinyl sulfides.

The trifluoromethyl vinyl sulfides of this invention are an especially preferred embodiment since they form higher molecular weight polymers than perfluoroalkyl vinyl sulfides having more than one carbon atom in the perfluoroalkyl group.

In addition to the specific copolymers described in Examples III and IV, this invention includes copolymers of any vinyl perfluoroalkyl sulfide with one or more other ethylenically unsaturated copolymerizable monomers. Thus, the polymeric products of this invention include copolymers of vinyl perfluoroalkyl sulfides, e.g., vinyl trifluoromethyl sulfide, vinyl pentafluoroethyl sulfide, vinyl heptafluoropropyl sulfide, and vinyl perfluoro-5-methylhexyl sulfide, with ethylenically unsaturated hydrocarbons, e.g., ethylene, propylene, styrene, divinylbenzene, 1,3-butadiene, and the like; halogenated ethylenic hydrocarbons, e.g., vinylidene chloride, vinyl fluoride, vinyl chloride, tetrafluoroethylene, chlorotrifluoroethylene, hexafluoropropene; acrylic and methacrylic acids and their derivatives, e.g., ethyl acrylate, methyl methacrylate, acrylonitrile, methacrylic anhydride; vinyl esters, e.g., vinyl acetate, vinyl benzoate, vinyl laurate; vinyl ketones, e.g., ethyl vinyl ketone; butenedioic acids and their derivatives, e.g., maleic and fumaric acids and their esters, nitriles and anhydrides. The proportions of the different comonomers in the polymers of this invention can range over a wide limit, for example, the polymers can contain from 5% to 100% of the vinyl perfluoroalkyl sulfide. Preferably, the copolymers contain at least 10% of the vinyl perfluoroalkyl sulfide since these proportions give polymeric products having the best properties.

The polymers obtained from the perfluoroalkyl vinyl sulfides can have a wide range of molecular weights. Thus, the molecular weights of the polymers may be relatively low, e.g., 1000 or lower, or they can be of intermediate range, e.g., 5000–20,000, or they can be as high as 50,000 or more. The actual molecular weight of the polymer obtained under specific conditions depends to some extent on the conditions of polymerization that are used.

The polymers of this invention are useful in a wide variety of applications because of the wide range of properties they possess, which properties in turn depend on the molecular weight of the polymer and the particular perfluoroalkyl group in the monomeric perfluoroalkyl vinyl sulfide from which the polymer is prepared. Thus, the polymers range from viscous, greasy liquids and low melting, tacky solids to clear, hard solids and tough elastomers. The polymers prepared from perfluoroalkyl vinyl sulfides having shorter chain perfluoroalkyl groups, e.g., CF₃ and C₂F₅, are soluble in many organic liquids, e.g., diethyl ether, acetone and benzene. Those with longer chain perfluoroalkyl groups, e.g. (CF₃)₂CF(CF₂)₄ are less soluble or insoluble in these solvents. More particularly, the higher molecular weight polymers of this invention can be used to form elastomeric films. The polymers of both low and high molecular weight containing the shorter chain perfluoroalkyl groups can be dissolved in organic solvents to form coating compositions for application to surfaces of wood, metal, paper, cloth and the like. For example, samples of paper, wood, and cotton are waterproofed by immersion in an 8.85% (by weight) solution of poly(vinyl trifluoromethyl sulfide) in acetone, followed by air-drying.

In addition to their utility as polymerizable monomers, the vinyl perfluoroalkyl sulfides of this invention are also useful as chemical intermediates. This is demonstrated by their photocatalyzed reaction with fluorinated thiols to give 1,2-bis(fluoroalkylthio)ethanes, R$_f$SCH₂CH₂SR$_f$, wherein R$_f$ is perfluoroalkyl, as illustrated by the following equations:

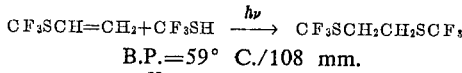

B.P.=59° C./108 mm.
$n_D^{25}$=1.3740

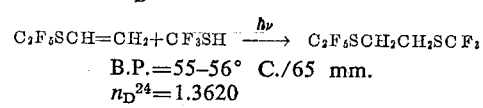

B.P.=55–56° C./65 mm.
$n_D^{24}$=1.3620

These new 1,2-bis(fluoroalkylthio)ethanes are useful as solvents for polymers. For example, poly(vinyl trifluoromethyl sulfide) dissolves in 1,2-bis(trifluoromethylthio)ethane and such solutions can be used to waterproof paper and wood as described above.

Since obvious modifications and equivalents in the invention will be apparent to those skilled in the chemical arts, I propose to be bound solely by the appended claims.

The embodiments of the invention in which an exclusive property or privilege is claimed are defined as follows.

I claim:
1. Vinyl perfluoroalkyl sulfides.
2. Vinyl trifluoromethyl sulfide.
3. Vinyl pentafluoroethyl sulfide.
4. Vinyl perfluoro-5-methylhexyl sulfide.
5. The process which comprises the steps of sequentially (1) reacting ethylene with a perfluoroalkanesulfenyl halide and (2) dehydrohalogenating the reaction product of step (1) to a vinyl perfluoroalkyl sulfide.
6. The process which comprises the steps of sequentially (1) reacting ethylene with pentafluoroethanesulfenyl chloride and (2) dehydrohalogenating the reaction product of step (1) to vinyl pentafluoroethyl sulfide.
7. The process which comprises the steps of sequentially (1) reacting ethylene with perfluoro-5-methylhexanesulfenyl chloride and (2) dehydrohalogenating the reaction product of step (1) to vinyl perfluoro-5-methylhexyl sulfide.
8. The process which comprises the steps of sequentially (1) catalytically reacting a vinyl halide and a perfluoroalkanethiol and (2) dehydrohalogenating the reaction product of step (1) to a vinyl perfluoroalkyl sulfide.
9. The process of claim 8 wherein the catalysis is accomplished by means of free radicals.
10. The process of claim 8 wherein the catalysis is accomplished by means of ultraviolet light.
11. The process which comprises the steps of sequentially (1) catalytically reacting vinyl chloride and trifluoromethanethiol and (2) dehydrohalogenating the reaction product of step (1) to vinyl trifluoromethyl sulfide.
12. The process of producing a vinyl perfluoroalkyl sulfide which comprises dehydrohalogenating a 2-haloethyl perfluoroalkyl sulfide.
13. A polymer of a vinyl perfluoroalkyl sulfide.
14. Poly(vinyl trifluoromethyl sulfide).
15. A polymer of a vinyl perfluoroalkyl sulfide and another ethylenically unsaturated compound.

16. The copolymer of vinyl trifluoromethyl sulfide with acrylonitrile.

17. The copolymer of vinyl trifluoromethyl sulfide with methyl methacrylate.

18. Poly(vinyl pentafluoroethyl sulfide).

19. Poly(vinyl perfluoro-5-methylhexyl sulfide).

20. The process which comprises reacting a mixture of vinyl trifluoromethyl sulfide and acrylonitrile having an essentially 1:1 weight ratio to form a polymer.

21. The process which comprises reacting a mixture of vinyl trifluoromethyl sulfide and methyl methacrylate having an essentially 1:1 weight ratio to form a polymer.

22. A film formed from a polymer of claim 13.

23. A film formed from a polymer of claim 15.

24. A film formed from a copolymer of vinyl trifluoromethyl sulfide with methyl methacrylate.

References Cited in the file of this patent

UNITED STATES PATENTS

| | | |
|---|---|---|
| 2,930,815 | Nedwick | Mar. 29, 1960 |
| 2,961,470 | Sheppard | Nov. 22, 1960 |